(12) United States Patent
Stokki et al.

(10) Patent No.: US 7,811,476 B2
(45) Date of Patent: Oct. 12, 2010

(54) ELECTRICALLY CONDUCTIVE FLOOR COVERINGS

(75) Inventors: Anders Stokki, Ronneby (SE); Roland Karlsson, Listerby (SE)

(73) Assignee: Tarkett SAS, Nanterre (FR)

( * ) Notice: Subject to any disclaimer, the term of this patent is extended or adjusted under 35 U.S.C. 154(b) by 0 days.

(21) Appl. No.: 10/596,261

(22) PCT Filed: Nov. 25, 2004

(86) PCT No.: PCT/EP2004/053091
§ 371 (c)(1),
(2), (4) Date: Jun. 16, 2006

(87) PCT Pub. No.: WO2005/059044
PCT Pub. Date: Jun. 30, 2005

(65) Prior Publication Data
US 2007/0108421 A1 May 17, 2007

(30) Foreign Application Priority Data
Dec. 17, 2003 (EP) .................................. 03293199

(51) Int. Cl.
*H01B 1/00* (2006.01)
(52) U.S. Cl. ................... 252/500; 252/511; 252/513; 428/138; 428/343; 428/497
(58) Field of Classification Search ............... 252/500, 252/514, 511, 513; 428/95, 143, 422.8, 541, 428/109, 195.1, 323, 328, 497, 343, 138; 524/403, 155; 156/222; 427/122, 126.2; 442/110, 340; 528/25; 429/223; 342/1
See application file for complete search history.

(56) References Cited

U.S. PATENT DOCUMENTS

| 3,582,445 | A | * | 6/1971 | Okuhashi | 428/96 |
|---|---|---|---|---|---|
| 3,922,383 | A | * | 11/1975 | Wilks et al. | 428/384 |
| 3,955,022 | A | * | 5/1976 | Sands | 428/95 |
| 4,101,689 | A | * | 7/1978 | Wienand et al. | 427/122 |
| 4,218,507 | A | * | 8/1980 | Deffeyes et al. | 428/328 |
| 4,310,581 | A | * | 1/1982 | Felter et al. | 428/109 |
| 4,419,279 | A | | 12/1983 | Abrams | |
| 4,496,475 | A | * | 1/1985 | Abrams | 252/514 |
| 4,590,120 | A | * | 5/1986 | Klein | 442/340 |
| 4,624,865 | A | * | 11/1986 | Gindrup et al. | 427/126.2 |
| 4,670,075 | A | * | 6/1987 | Heckel et al. | 156/222 |
| 4,770,916 | A | * | 9/1988 | Leukel et al. | 428/95 |
| 4,885,659 | A | * | 12/1989 | Nowell et al. | 361/212 |
| 4,920,167 | A | * | 4/1990 | Ruetman et al. | 524/155 |
| 5,120,811 | A | * | 6/1992 | Glotfelter et al. | 528/25 |
| 5,173,531 | A | * | 12/1992 | Kissel | 524/403 |
| 5,516,546 | A | * | 5/1996 | Hari et al. | 427/122 |
| 5,626,948 | A | * | 5/1997 | Ferber et al. | 428/195.1 |
| 5,786,785 | A | * | 7/1998 | Gindrup et al. | 342/1 |
| 6,218,001 | B1 | * | 4/2001 | Chen et al. | 428/323 |
| 6,436,159 | B1 | * | 8/2002 | Safta et al. | 51/298 |
| 6,503,627 | B1 | * | 1/2003 | Niimi et al. | 428/409 |
| 6,831,023 | B1 | * | 12/2004 | Szerreiks et al. | 442/110 |
| 6,861,138 | B1 | * | 3/2005 | Pfaff et al. | 428/343 |
| 7,138,203 | B2 | * | 11/2006 | Baars et al. | 429/36 |
| 2001/0051299 | A1 | * | 12/2001 | Yano et al. | 429/223 |
| 2002/0168500 | A1 | * | 11/2002 | Graab et al. | 428/143 |
| 2003/0113566 | A1 | * | 6/2003 | Clemens et al. | 428/497 |
| 2003/0173545 | A1 | * | 9/2003 | Hino et al. | 252/500 |
| 2003/0203213 | A1 | * | 10/2003 | Woo et al. | 428/422.8 |
| 2004/0058147 | A1 | * | 3/2004 | Ozawa et al. | 428/325 |
| 2004/0091731 | A1 | * | 5/2004 | Tofuku et al. | 428/545 |
| 2005/0004269 | A1 | * | 1/2005 | Kakegawa | 523/300 |
| 2005/0227104 | A1 | * | 10/2005 | Kim et al. | 428/541 |

FOREIGN PATENT DOCUMENTS

| DE | 102 00 292 A1 | | 4/2003 |
|---|---|---|---|
| EP | 0409 099 A2 | | 1/1991 |
| EP | 0409 099 A3 | | 1/1991 |
| EP | 1 284 278 A2 | | 2/2003 |
| GB | 1034597 | * | 6/1966 |
| GB | 1121721 | * | 7/1968 |
| JP | 58-032668 | * | 2/1983 |
| JP | 58-042670 | * | 3/1983 |
| JP | 62-291362 | * | 12/1987 |
| JP | 09-241543 | * | 9/1997 |

* cited by examiner

*Primary Examiner*—Mark Kopec
*Assistant Examiner*—Khanh Tuan Nguyen
(74) *Attorney, Agent, or Firm*—Norris McLaughlin & Marcus

(57) ABSTRACT

A surface covering comprising a substrate and a top coating characterized in that the top coating comprises particles with a conductive coating having a mean size between 0.1 and 50 μm.

6 Claims, No Drawings

ELECTRICALLY CONDUCTIVE FLOOR COVERINGS

FIELD OF THE INVENTION

The invention relates to an electrically conductive floor covering.

DESCRIPTION OF THE RELATED ART

Static charges, which are produced by walking or travelling on plastic floor coverings, particularly at low atmospheric humidity, represent a serious problem, particularly for sensitive electronic components. The electronic components may be damaged or their function may be impaired by electrostatic discharges. Furthermore, in areas in which easily flammable materials are worked with, there is the danger that these materials will be ignited by spark-over in the event of static discharges. The avoidance of static charges is particularly important in surroundings which are air-conditioned and therefore have a low atmospheric humidity, such as computer centers, manufacturing facilities for electronic components and electronic devices, radiological facilities, operating rooms, and other areas in which care is taken to provide an atmosphere low in dust and particles.

The floor coverings typically used, for example those based on polyvinyl chloride or rubber mixtures, are insulators. They may be made conductive if conductive fillers or antistatic agents are mixed in. However, a relatively large quantity, typically between 30 and 50 volume-percent of a conductive filler, must be used to achieve a sufficient conductivity. Metallic materials, conductive carbon black, or graphite are used in particular as conductive fillers, but the use of the necessary quantities results in black or gray products. If antistatic agents are used, there is the disadvantage that these materials react very strongly to changes in atmospheric humidity and their effectiveness is therefore strongly dependent on the environmental conditions.

A method for producing highly compressed, conductive covering material from thermoplastic plastics is known from European Patent A 869 217, in which particles of the thermoplastic plastic, which are provided with a coating containing a conductive substance, are compressed under elevated temperature and high pressure into a block with conductive paths and subsequently split transversely to the direction of the conductive paths into slabs of the desired thickness, with these slabs having conductive paths in the direction of their thickness. In this way, light-colored, conductive floor coverings made of thermoplastic plastic are obtained.

Polyurethane (PU) and other top coatings such as PU acrylates, epoxy acrylates, polyester acrylates, polyether acrylates, silicone acrylates etc are widely used as surface reinforcement on plastic floorings, for residential use as well as for commercial use. These top coatings make the surface of the floor covering smoother, decrease the friction and because of that improve the cleaning and maintenance properties.

One disadvantage with the existing top coatings is their electrical insulation properties that make them unsuitable for conductive homogeneous floorings.

Conductive floorings should have an electrical resistance between 0.05 and 1.0 MΩ during the entire product lifetime. To reach this goal, the top coating should not have any or very low influence on the total conductivity of the flooring. The conductivity of the flooring should be determined by the amount and quality of conductive material in the substrate, for example by the carbon black (black spots) integrated into the substrate.

For a conductive floor covering the electrical resistance according to EN 1081 will increase from approx. 0.05-0.1 MΩ to more than 100 MΩ when a traditional top coating is applied. The height of the increase depends on thickness, the nature and grade of the top coating used.

The use of chemical additives to lower the electrical resistance is well known, but is not suitable for floorings because the resulting top coatings show a low stain resistance, a risk for migration of the additives in some cases and because the conductivity obtained is not stable in time. Often these chemicals also decrease the transparency and/or give a colour to the top coating.

Mineral materials or conductive pigments can also be used to lower the electrical resistance, but they have generally a colouring effect on the coating.

SUMMARY OF THE INVENTION

In accordance with the present invention, a surface covering comprising a substrate and a surface or top coating is provided for conductive flooring with a top coating exhibiting improved cleaning and maintenance properties as well as an good transparency.

Accordingly the invention provides a new and improved surface covering comprising a substrate and a top coating characterised in that the top coating comprises particles with a conductive coating having a mean particle size (in numbers) between 0.1 and 50 μm.

The conductive flooring with a top coating according to the invention exhibits improved cleaning and maintenance properties as well as an increased transparency. Furthermore the conductivity of the flooring remains constant during its entire lifetime.

According to a preferred embodiment, the particles are substantially spherical. Such spherical particles are more easily mixed with the top coating before the application of said top coating to the substrate.

The particles preferably comprise a coating of silver, aluminium, copper, nickel, gold or an alloy thereof with another metals. Metal-coated spherical beads are especially preferred. Such a metal coating gives very good performances and allows to effectively lead any charges accumulating in the top coating down the substrate through which they are then lead to the ground.

The particles or the metal-coated spherical beads have a dry bulk resistivity of advantageously between 0.0001 and 0.01 Ohms/cm. Very good results are achieved with metal-coated spherical beads having a dry bulk resistivity of about 0.001 Ohms/cm.

The top coating comprises between 0.01 and 10% w/w of particles based on the weight of the top coating. The optimal ratio depends mainly on the type and on the thickness of top coating material used.

The top coating comprises preferably a PU-dispersion (like Neovez R988 of Neokesins), a PU-solution, a 2-components PU, a PU acrylate (like Aqualux 1420-8500 from Teknos A/S), an epoxy acrylate, a polyester acrylate, a polyether acrylate, a silicone acrylate or a mixture thereof.

The coating comprises an urethane derived polymer preferably polyurethane and most preferably a water based UV-curable PU-acrylate dispersion with a dry content of between 5% and 80% w/w preferably 20 and 60% w/w. Such top coatings are widely used in the art for applications where an electrical conductivity is not required.

The top coating normally has a thickness of between 0.5 μm to 100 μm.

The top coating may be applied by any known technique like roller coating, reverse and inreverse, spraying, curtain, screen etc.

Of course, the size of the particles with a conductive coating thickness depends on the thickness of the top coating. As a general rule, the mean size of the particles should not be more than about half of the thickness of the top coating.

The above described top coating may be used on any a conductive and antistatic flooring, preferably on a PVC based flooring with vertical conductive channels, containing carbon black. Such a product is commercially available from the Tarkett AB under the trademark TORO EL. Polyolefin or rubber based floors may also be used.

DETAILED DESCRIPTION OF A PREFERRED EMBODIMENTS

The present invention will be described in more detail in the following with reference to the example

Example 1

In order to produce a conductive flooring the following materials were used:

1) Conductive silver glass spheres (CSGS 10 A, available from Progessive Fillers Intl Inc. of Tennessee, USA) having a mean particle size of 10 μm, a pure silver plating of 12% and a dry bulk resisitivty of 0.001 Ohms/cm 2) Top coat: Aqualux™ from Teknos A/S Denmark, a water based UV-curable PU-acrylate dispersion with a dry content of approx. 40%.

3) Plastic flooring of PVC (Toro EL available form Tarkett AB Sweden) with "vertical conductive channels" containing carbon black.

About 1% w/w of CSGS 10A were mixed in the above mentioned PU-acrylate dispersion and the conductive flooring were coated with approx 20 g/m2 in a roller coating station.

The "film" thickness of the top coating after drying was about 8

Two control samples were used to compare the results one without any top coating and an other one with the same top coating but without any conductive particles.

Since only approx. 1% of CSGS 10A particles were used the top coating is transparent. The CSGS 10A particles give no or very little visible change of the surface. The rather low content of spheres implies also that the top coat only is conductive in the vertical direction from the surface to the conductive substrate and not in the horizontal direction.

The properties of the flooring were determined according to the following methods 1) European Standard EN 1081 (January 1998): Resilient floor coverings-Determination of the electrical resistance. 2) ESD association standard (ANSI/ESDS7.1-1994))

It was found that the electrical resistance of the conductive flooring (Toro EL) without top coat was between 0.03-0.1 MΩ, whereas the electrical resistance of the conductive flooring (Toro EL) with PU coating without CSGS was >500MΩ. The electrical resistance of conductive flooring (Toro EL) with conductive PU according to the invention was 0.05-0.2 MΩ.

No colour change was noticed using the above concentration of particles, no dependency on air humidity and a very high vertical conductivity through the top coating according to the invention to the conductive parts (carbon black) in the substrate. This top coating does not increase the electrical resistance of the flooring significantly. The resistance of the substrate beneath the PU top coat determines the flooring conductivity. Since a "normal" amount of PU was used, the flooring cleaning properties were very much improved compared to the reference without PU.

The invention claimed is:

1. A floor surface covering consisting of a conductive or antistatic substrate consisting of a polyvinylchloride, polyolefin or rubber based flooring with vertical conductive channels containing carbon black and a transparent topcoating which cures by drying, the topcoating having a thickness of between 0.5 μm and 100 μm and consisting of a polyurethane polymer selected from the group consisting of a PU-dispersion, a PU-solution, a two component polyurethane, a PU acrylate, or a mixture thereof and particles with a conductive coating, the particles with a conductive coating consisting of between 0.01 and 10% by weight of the topcoating of substantially spherical glass particles with a conductive coating consisting of silver and having a mean size between 0.1 and 50 μm.

2. The floor surface covering of claim 1, wherein the particles have a dry bulk resistivity of between 0.0001 and 0.01 Ohms/cm.

3. The floor surface covering of claim 1, wherein the polymer of the topcoating consists of a water based UV-curable PU-acrylate dispersion with a dry content of between 5% and 80% w/w.

4. The floor surface covering of claim 3, wherein the dry content is between 20% and 60% w/w.

5. A floor surface covering consisting of a plastic conductive or antistatic flooring substrate and a transparent topcoating which cures by drying, the topcoating having a thickness of between 0.5 μm and 100 μm consisting of a polymer consisting of a polyurethane dispersion, a polyurethane solution, a two component polyurethane, a polyurethane acrylate, an epoxy acrylate, a polyester acrylate, a polyether acrylate, a silicone acrylate or a mixture thereof and particles with a conductive coating consisting of between 0.01 and 10% by weight of the topcoating of substantially spherical glass particles with a conductive coating consisting of silver and having a mean size between 0.1 and 50 μm.

6. The floor surface covering of claim 5 wherein the topcoating is a polymer consisting of a polyurethane and particles with a conductive coating consisting of about 1% by weight of the topcoating of substantially spherical silver plated glass particles having a mean size of 10 μm.

* * * * *